United States Patent
Zhang et al.

(10) Patent No.: US 11,200,092 B2
(45) Date of Patent: Dec. 14, 2021

(54) CONVOLUTIONAL COMPUTING ACCELERATOR, CONVOLUTIONAL COMPUTING METHOD, AND COMPUTER-READABLE STORAGE MEDIUM

(71) Applicant: TENCENT TECHNOLOGY (SHENZHEN) COMPANY LIMITED, Shenzhen (CN)

(72) Inventors: Bo Zhang, Shenzhen (CN); Xiaoyu Yu, Shenzhen (CN); Yuwei Wang, Shenzhen (CN); Lixin Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/888,918

(22) Filed: Jun. 1, 2020

(65) Prior Publication Data
US 2020/0293379 A1   Sep. 17, 2020

Related U.S. Application Data

(63) Continuation of application No. PCT/CN2019/075431, filed on Feb. 19, 2019.

(30) Foreign Application Priority Data

Mar. 27, 2018  (CN) .......................... 201810259875.1

(51) Int. Cl.
*G06F 9/50*   (2006.01)
*G06F 9/38*   (2018.01)
(Continued)

(52) U.S. Cl.
CPC ............. *G06F 9/5027* (2013.01); *G06F 1/08* (2013.01); *G06F 9/3802* (2013.01); *G06F 17/153* (2013.01); *G06N 3/063* (2013.01)

(58) Field of Classification Search
None
See application file for complete search history.

(56) References Cited

U.S. PATENT DOCUMENTS 9,697,463 B2 *   7/2017   Ross ..................... G06N 3/0454
9,805,304 B2 *  10/2017   Ross ..................... G06F 15/8046
(Continued)

FOREIGN PATENT DOCUMENTS

CN   102592258 A     7/2012
CN   109409511 A  *  3/2019

OTHER PUBLICATIONS

'Efficient Processing of Deep Neural Networks: A Tutorial and Survey' by Vivienne Sze, Aug. 13, 2017. (Year: 2017).*
(Continued)

*Primary Examiner* — Steven G Snyder
(74) *Attorney, Agent, or Firm* — Anova Law Group, PLLC

(57) ABSTRACT

Embodiments of this application relate to a convolutional computing accelerator, a convolutional computing method, and a convolutional computing device, which belong to the technical field of electronic circuits. The convolutional computing accelerator includes: a controller, a computing matrix, and a first cache. The computing matrix comprising at least one row of computing units, each row of computing units comprising at least two adjacent connected computing units. The controller is configured to control input data of each row of computing units to be loaded into the first cache, and to control the input data loaded into the first cache to be inputted into the two adjacent computing units in a corresponding row. Each of the computing units in the corre-
(Continued)

sponding row is configured to perform, in a first clock cycle, a convolutional computation based on received input data and a pre-stored convolutional kernel.

14 Claims, 12 Drawing Sheets

(51) Int. Cl.
*G06F 1/08* (2006.01)
*G06N 3/063* (2006.01)
*G06F 17/15* (2006.01)

(56) References Cited

U.S. PATENT DOCUMENTS

| | | | |
|---|---|---|---|
| 9,858,636 B1* | 1/2018 | Lim | G06T 5/20 |
| 10,438,117 B1* | 10/2019 | Ross | G06N 3/08 |
| 10,606,918 B2* | 3/2020 | Lim | G06F 17/153 |
| 10,678,508 B2* | 6/2020 | Vantrease | G06F 17/153 |
| 10,878,316 B2* | 12/2020 | Ross | G06F 15/8046 |
| 10,929,746 B2* | 2/2021 | Litvak | G06F 7/5443 |
| 10,983,754 B2* | 4/2021 | Vantrease | G06F 7/5443 |
| 10,990,648 B2* | 4/2021 | Janedula | G06N 3/0454 |
| 2016/0342891 A1 | 11/2016 | Ross et al. | |
| 2018/0276532 A1* | 9/2018 | Kim | G06N 20/00 |
| 2018/0285715 A1* | 10/2018 | Son | G06N 3/08 |
| 2019/0042923 A1* | 2/2019 | Janedula | G06N 3/063 |
| 2019/0065208 A1* | 2/2019 | Liu | G06F 17/16 |
| 2019/0164043 A1* | 5/2019 | Litvak | G06N 3/063 |
| 2019/0228307 A1* | 7/2019 | Lee | G06N 3/08 |
| 2019/0340508 A1* | 11/2019 | Liu | G05B 13/027 |
| 2020/0159809 A1* | 5/2020 | Catthoor | G06N 3/08 |
| 2021/0192336 A1* | 6/2021 | Hanagandi | G06N 3/08 |

OTHER PUBLICATIONS

The World Intellectual Property Organization (WIPO) International Search Report for PCT/CN2019/075431 dated May 29, 2019 5 Pages (including translation).

Zidong Du et al., "ShiDianNao: Shifting Vision Processing Closer to the Sensor," ACM SIGARCH Computer Archtecture News—ISCA'15, vol. 43, No. 3, Jan. 4, 2016 (Jan. 4, 2016), ISSN: 0163-5964, p. 92, right column to p. 103, left column Total 13 pages.

* cited by examiner

CONVOLUTIONAL COMPUTING ACCELERATOR, CONVOLUTIONAL COMPUTING METHOD, AND COMPUTER-READABLE STORAGE MEDIUM

RELATED APPLICATIONS

This application claims priority to PCT Application No. PCT/CN2019/075431, filed on Feb. 19, 2019, which claims priority to Chinese Patent Application No. 201810259875.1, filed with National Intellectual Property Administration, PRC on Mar. 27, 2018, entitled "CONVOLUTIONAL COMPUTING ACCELERATOR, CONVOLUTIONAL COMPUTING METHOD, AND CONVOLUTIONAL COMPUTING DEVICE," which are both incorporated herein by reference in their entirety.

FIELD OF THE TECHNOLOGY

This application relates to the technical field of electronic circuits, and in particular, to a convolutional computing accelerator, a convolutional computing method, and a convolutional computing device.

BACKGROUND OF THE DISCLOSURE

In the field of data processing, many data processing processes, such as image processing through a convolutional neural network (CNN), require a large number of convolutional computation steps.

In the related art, a computer device may accelerate the computing speed of a convolutional computation by hardware acceleration. In particular, for example, the computer device may be connected to a dedicated convolutional computing accelerator. The convolutional computing accelerator includes a computing matrix, a controller, and an input cache. The computing matrix includes several computing units. Input data corresponding to each computing unit is independently cached, and is controlled and transmitted by the controller to a corresponding computing unit during the convolutional computation. The computing unit performs a convolutional computation on the input data and a convolutional kernel.

In the related art, because the input data of each computing unit in a computing matrix is independently cached and directly controlled and transmitted, by the controller, to the corresponding computing unit, the system requires a higher cache capacity and input bandwidth for the convolutional computing accelerator, which affects the expandability of the computing matrix.

SUMMARY

Embodiments of this application provide a convolutional computing accelerator, convolutional computing method, and convolutional computing device to resolve a problem below: because input data of each computing unit in a computing matrix in the related art is independently cached, and is directly controlled and transmitted by a controller to a corresponding computing unit, it is necessary to design a higher cache capacity and input bandwidth for the convolutional computing accelerator, affecting expandability of the computing matrix. The technical solutions are as follows.

In one aspect of the present disclosure—a convolutional computing accelerator is provided. The convolutional computing accelerator includes: a controller, a computing matrix, and a first cache. The computing matrix comprising at least one row of computing units, each row of computing units comprising at least two adjacent connected computing units. The controller is configured to control input data of each row of computing units to be loaded into the first cache, and to control the input data loaded into the first cache to be inputted into the two adjacent computing units in a corresponding row. Each of the computing units in the corresponding row is configured to perform, in a first clock cycle, a convolutional computation based on received input data and a pre-stored convolutional kernel.

In another aspect of the present disclosure, a convolutional computing method performed by the convolutional computing accelerator is provided. The convolutional computing accelerator includes a controller, a computing matrix, and a first cache, the computing matrix comprising at least one row of computing units, each row of computing units comprising at least two connected computing units. The method includes controlling, by the controller, input data of each row of computing units to be loaded into the first cache; controlling, by the controller, the input data loaded into the first cache to be inputted into the at least two computing units in a corresponding row; and performing, in a first clock cycle, by each of the at least two computing units in the corresponding row, a convolutional computation based on the received input data and a pre-stored convolutional kernel.

In another aspect of the present disclosure, a computer-readable storage medium is provided. The storage medium storing one or computer executable instructions, when executed by one or more coprocessors, the computer executable instructions implement operations including: controlling, by a controller, input data of each row of computing units to be loaded into a first cache; controlling, by the controller, the input data loaded into the first cache to be inputted into at least two connected computing units in a corresponding row; and performing, in a first clock cycle, by each of the at least two connected computing units in the corresponding row, a convolutional computation based on the received input data and a pre-stored convolutional kernel.

Technical solutions provided in the embodiments of this application may include the following beneficial effects.

Two adjacent computing units included in each row of the computing matrix are connected. When the convolutional computation is performed, the controller controls input data corresponding to each computing unit to be successively input to each computing unit in the row of computing units, and the same row of computing units perform a convolutional computation on the input data and the pre-stored convolutional kernel. In other words, at least two computing units in the same row multiplex same input data, and only one input channel is needed, thereby reducing the required cache capacity and input bandwidth of the computing matrix, and improving expandability of the computing matrix.

It is to be understood that the above descriptions and the following detailed descriptions are merely for exemplary and explanatory purposes, and should not limit the scope of this application.

BRIEF DESCRIPTION OF THE DRAWINGS

The accompanying drawings, which are incorporated herein and constitute a part of this specification, illustrate embodiments consistent with this application and, together with the specification, serve to explain the principles of this application.

DESCRIPTION OF EMBODIMENTS

Exemplary embodiments are described in detail herein, and examples of the exemplary embodiments are shown in the accompanying drawings. When the following descriptions relate to the accompanying drawings, unless indicated otherwise, same numbers in different accompanying drawings represent same or similar elements. The implementations described in the following exemplary embodiments do not represent all implementations consistent with this application. On the contrary, the implementations are merely examples of apparatuses and methods that are described in detail in the appended claims and that are consistent with some aspects of this application.

According to solutions shown in embodiments of this application, convolutional computation is accelerated through a hardware circuit. In other words, in a data processing process, convolutional computation involved is sent, through a drive program, to the hardware circuit for computation. The hardware circuit provides, after obtaining a convolutional result through computation, the convolutional computation result to other hardware circuits or software programs for use.

In some embodiments of this application, the foregoing hardware circuit may be implemented through a field programmable gate array (FPGA). In particular, a computing matrix may be formed based on DSPs on the FPGA. Each FPGA may obtain at least one computing matrix through division according to a number of the included DSPs and specifications of the computing matrix, and a plurality of computing matrices perform convolutional computations in parallel.

Further, the FPGA may be set in a convolutional computing device (equivalent to a peripheral device of a computer device) connected to the computer device running a data processing software program. The data processing software program may be invoked by a drive program of the peripheral device to accelerate the convolutional computation.

Figure 1:
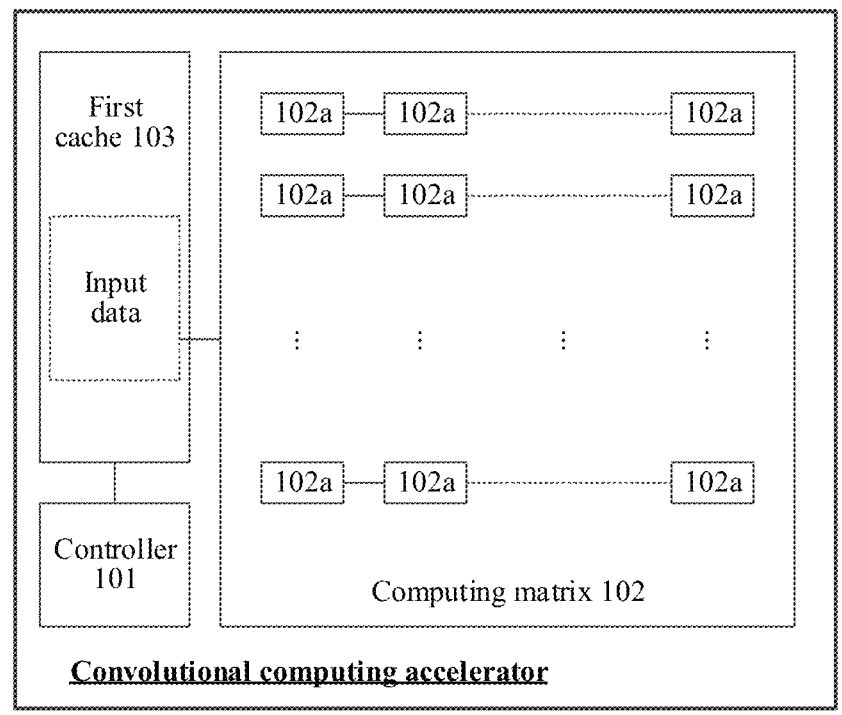
FIG. 1 is a schematic structural diagram of a convolutional computing accelerator according to one embodiment of the present disclosure.

FIG. 1 is a schematic structural diagram of a convolutional computing accelerator according to one embodiment of the present disclosure. As shown in FIG. 1, the convolutional computing accelerator includes: a controller 101, a computing matrix 102, and a first cache 103. The computing matrix 102 includes at least one row of computing units. Each row of computing units includes at least two computing units 102a, two adjacent computing units 102a in each row of computing units being connected.

The controller 101 is configured to control input data of each row of computing units to be loaded into the first cache 103.

The controller 101 is further configured to control the input data loaded into the first cache to be inputted into a computing unit 102a in a corresponding row. The computing unit 102a in the corresponding row transmits the input data in the computing units 102a in the corresponding row.

Each computing unit 102a of the computing units 102a in the corresponding row is configured to perform a convolutional computation on the received input data and a pre-stored convolutional kernel.

The convolutional computation result obtained through the convolutional computation may be provided to other hardware circuits or software programs for subsequent processing.

In an embodiment of this application, each piece of input data and each convolutional kernel may be a two-dimensional data matrix, respectively. For example, the foregoing convolutional computing accelerator is configured to perform a convolutional computation through CNN during image processing. The input data is feature data extracted from an image, and the convolutional kernel is, for example, a feature weight in a CNN model. Each piece of input data may be a 10×10 data matrix, that is, the data matrix is divided into 10 rows, each row including 10 data elements. Each data element is feature data extracted from the image. Correspondingly, each convolutional kernel may be a 3×3 weight matrix, that is, the weight matrix is divided into 3 rows, each row including 3 weight elements. Each weight element is a weight value used for multiplying the data element. The input data and convolutional kernel are only exemplified by two-dimensional data. In a practical application, the input data and convolutional kernel may also be three-dimensional data.

In the convolutional computing accelerator shown in one embodiment of this application, each computing unit in a row of computing units pre-stores a convolutional kernel. When the computing matrix 102 performs a convolutional computation, the input data corresponding to the row of computing units may be successively inputted into each computing unit in the row of computing units in a pipeline manner, and the convolutional computation is performed on the input data and the corresponding convolutional kernel in each computing unit.

Figure 2:
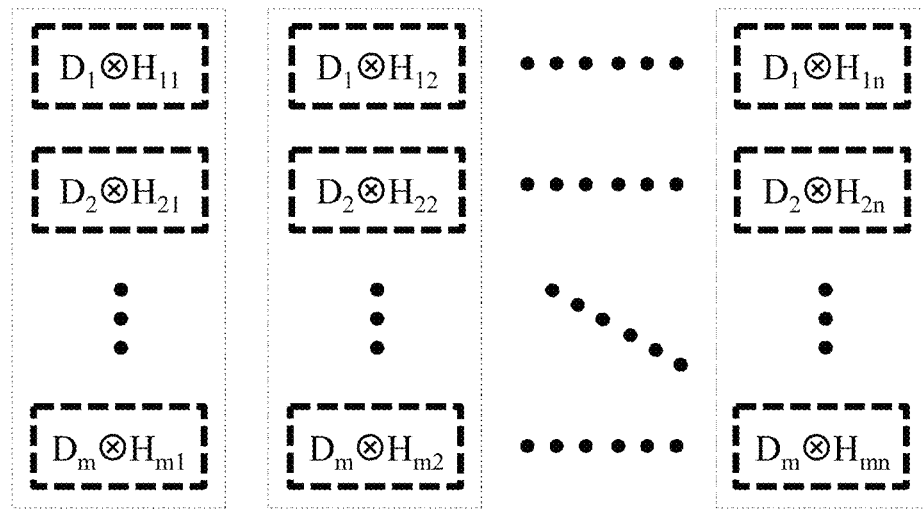
FIG. 2 is a schematic diagram of a convolutional computation involved in the embodiment shown in FIG. 1.

For example, referring to FIG. 2, a schematic diagram of a convolutional computation involved in one embodiment of this application is shown. As shown in FIG. 2, $D_1$, $D_2$, ..., $D_m$ are m pieces of input data, and $H_{1x}$, $H_{2x}$, ..., $H_{mx}$ are convolutional kernels pre-stored in the $m^{th}$ row of computing units. $H_{11}$ is a convolutional kernel pre-stored in a first computing unit of the first row of computing units, $H_{12}$ is a convolutional kernel pre-stored in a second computing unit of the first row of computing units, and $H_{1n}$ is a convolutional kernel pre-stored in an $n^{th}$ computing unit of the first row of computing units. Correspondingly, $H_{21}$ is a convolutional kernel pre-stored in a first computing unit of a second row of computing units, $H_{22}$ is a convolutional kernel pre-stored in a second computing unit of the second row of computing units, $H_{2n}$ is a convolutional kernel pre-stored in an $n^{th}$ computing unit of the second row of computing units, and so on.

In a process of the convolutional computation, a computing unit corresponding to each convolutional kernel in the computing matrix 102 performs a convolutional computation on $D_1$ and $H_{11}$, $H_{12}$, ..., $H_{1n}$, respectively, that is, $D_1 \otimes H_{11}$, $D_1 \otimes H_{12}$, ..., $D_1 \otimes H_{1n}$ in FIG. 2. Correspondingly, a convolutional computation is performed on $D_2$ and $H_{21}$, $H_{22}$, ..., $H_{2n}$, respectively, that is $D_2 \otimes H_{21}$, $D_2 \otimes H_{22}$, ..., $D_2 \otimes H_{2n}$ in FIG. 2. A convolutional computation is performed on $D_m$ and $H_{m1}$, $H_{m2}$, ..., $H_{mn}$, respectively, that is, $D_m \otimes H_{m1}$, $D_m \otimes H_{m2}$, ..., $D_m \otimes H_{mn}$ in FIG. 2. The rest can be deduced by analogy.

The convolutional computation process shown in FIG. 2 schematically shows a solution of performing a convolution computation on same input data in each row and a convolutional kernel pre-stored in each computing unit in the row, but a timing sequence in which the convolutional computation is performed on the input data and the convolutional kernel is not limited. For example, in a practical application, for a first row of computing units, when a first computing unit in the first row performs a convolutional computation of $D_1 \otimes H_{11}$, the second computing unit in the first row may still not perform a convolutional computation of $D_1 \otimes H_{12}$. Similarly, when the first computing unit in the first row performs a convolutional computation of $D_1 \otimes H_{11}$, the first computing unit in the second row may still not perform a convolutional computation of $D_2 \otimes H_{21}$.

Based on the foregoing, in the convolutional computing accelerator shown in one embodiment of this application, two adjacent computing units included in each row of the computing matrix are connected. When the convolutional computation is performed, the controller controls input data corresponding to each row of computing units to be inputted into the row of the computing units, and each computing unit in the row of computing unit transmits the data in the corresponding row and performs the convolutional computation. In other words, at least two computing units in the same row multiplex same input data, and only one input channel is needed, thereby reducing cache capacity and input bandwidth requirements of the computing matrix, and improving expandability of the computing matrix.

Figure 3:
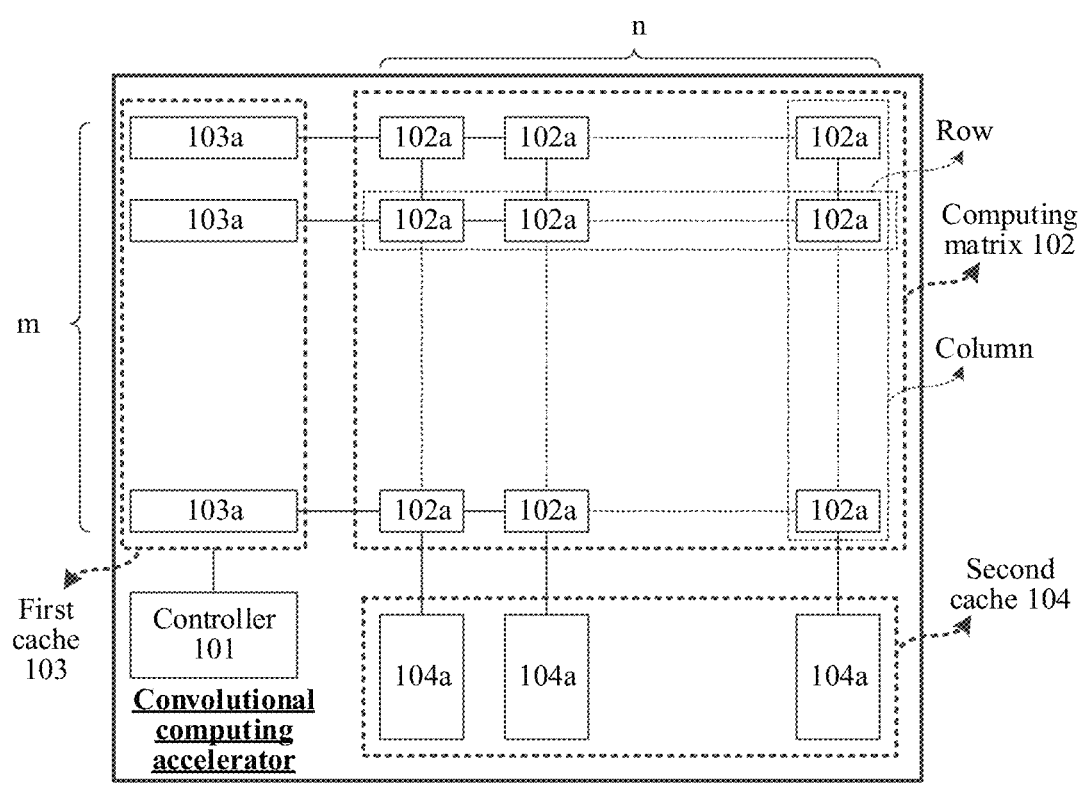
FIG. 3 is a schematic structural diagram of a convolutional computing accelerator according to one embodiment of the present disclosure.

FIG. 3 is a schematic structural diagram of a convolutional computing accelerator according to one embodiment of the present disclosure. As shown in FIG. 3, in the convolutional computing accelerator, a computing matrix 102 includes m rows and n columns of computing units 102a. M is an integer ≥1, n is an integer ≥2. Each computing unit 102a pre-stores a convolutional kernel. A first cache 103 includes m input buffers 103a (that is, each row of computing units corresponding to one input buffer). The convolutional computing accelerator further includes a second cache 104. The second cache 104 includes n output buffers 104a (that is, each row of computing units corresponding to one output buffer).

As shown in FIG. 3, a first computing unit 102a in each row of the computing matrix 102 is connected to one input buffer 103a, two adjacent computing units 102a in each column of the computing matrix 102 are connected, and a last computing unit 102a in each column of the computing matrix 102 is connected to one output buffer 104a.

When input data of each row of computing units is controlled to be loaded into the first cache 103, the controller 101 is specifically configured to control each piece of input data to be loaded into the input buffer 103a in a one-to-one correspondence with the input data.

When the input data loaded into the first cache 103 is controlled to be input to a computing unit 102a in a corresponding row, the controller 101 is specifically configured to transmit the input data into a register of a first computing unit in the corresponding row in a first clock cycle. The first computing unit of the computing units in the corresponding row is configured to transmit the received input data into a register of a next computing unit in the corresponding row in a next first clock cycle. The first computing unit is any computing unit in the corresponding row except a last computing unit.

The first clock cycle is a clock cycle for data transmission between elements (such as between a cache and a computing unit, or between a computing unit and a computing unit) in the convolutional computing accelerator.

In one embodiment of this application, for any row of computing units, each computing unit successively transmits input data every first clock cycle (such as 2 ns). For example, a piece of input data corresponding to the row of computing units is data A, assuming that within a first 2 ns, the controller transmits the data A into a register of a first computing unit in the row of computing units; within a second 2 ns, the first computing unit in the row of computing units transmits the data A within a previous 2 ns into a register of a second computing unit in the row of computing units. The rest can be deduced by analogy.

In some embodiments, when a convolutional computation is performed on the inputted input data and a pre-stored convolutional kernel, each computing unit 102a in the computing matrix 102 is configured to receive the input data in a first clock cycle, and perform a convolutional computation on the received input data and the pre-stored convolutional kernel in a next first clock cycle.

In one embodiment of this application, each computing unit may transmit, to a next computing unit in the same row in one first clock cycle, the input data registered in the previous first clock cycle, and may simultaneously perform a step of performing a convolutional computation on the stored input data and a locally pre-stored convolutional kernel in the previous first clock cycle. For example, following the foregoing example, for any row of computing units, each computing unit successively transmits input data every first clock cycle (2 ns). For example, a piece of first input data corresponding to the row of computing units is data A, assuming that within a first 2 ns, the controller transmits the data A into a register of a first computing unit in the row of computing units; within a second 2 ns, the first computing unit in the row of computing units transmits the stored data A within a previous 2 ns into a register of a second computing unit in the row of computing units, and further performs a convolutional computation on the data A and the pre-stored convolutional kernel in the first computing unit of the row of computing units. The rest can be deduced by analogy.

Each of the foregoing computing units may continue to perform a convolutional computation of a next piece of input data after processing a convolutional computation of one piece of input data. For example, following the foregoing example, for any row of computing units, each computing unit successively transmits input data every first clock cycle (2 ns). For example, when first input data corresponding to the row of computing units is data A, and next input data of the first input data is data B, within a second 2 ns, a first computing unit in the row of computing units transmits the data A stored in a previous 2 ns into a register of a second computing unit in the row of computing units, and simultaneously performs a computation on the data A and a convolutional kernel pre-stored in the first computing unit in the row of computing units. Simultaneously, the controller further transmits the data B into a register of the first computing unit of the row of computing units. In a third 2 ns, the first computing unit in the row of computing units transmits the data B stored in the previous 2 ns to the register of the second computing unit in the row of computing unit, and performs a convolutional computation on the data B and the convolutional kernel pre-stored in the first computing unit in the row of computing units. In other words, the first computing unit in the row of computing unit performs a step of convolutional computation on the data B and the convolutional kernel and transmitting the data B to a next computing unit, and this step is performed simultaneously with the step of performing, by the second computing unit in the row of computing units, a convolutional computation on the data A and the convolutional kernel and transmitting the data A to a next computing unit.

In the foregoing solution, for each row of computing units, all multiplication computations of the row of computing units share a piece of input data. In particular, when a convolutional computation is performed on one piece of input data, after the controller controls a first cache to send the input data to a first computing unit in a corresponding row of computing units, the first computing unit may send the input data to a second computing unit. Simultaneously, the first computing unit starts a step of a convolutional computation. Correspondingly, after the input data is sent to the second computing unit in the corresponding row of computing units, the second computing unit sends the input data to a third computing unit. Simultaneously, the second computing unit starts a step of a convolutional computation. The rest can be deduced by analogy.

In the foregoing solution, in one embodiment of this application, each row of computing units multiplexes one data input channel, a piece of input data passing through the channel in a pipeline manner, and being shared to all computing units in the row of computing units in the pipeline manner. Accordingly, a routing layout of input data in the convolutional computing accelerator is simplified. In this case, because the same piece of input data is shared to at least two computing units, there is no need to separately send the input data to each computing unit independently, reducing an input bandwidth required for the input data.

In one embodiment of this application, when the computing matrix 102 includes at least two rows of computing units (that is, m≥2), the at least two rows of computing units form at least two columns, two adjacent computing units in each column being connected. A second computing unit in the computing matrix 102 is further configured to store an accumulated convolutional computation result to a second cache. The accumulated convolutional computation result is an accumulated result of convolutional computation results of the computing units in a corresponding column. The second computing unit is any computing unit in a last row of the computing matrix.

In one embodiment of this application, corresponding convolutional kernels are pre-set, according to different usage scenarios, in each computing unit in a hardware circuit by setting the dedicated hardware circuit. The controller of the hardware circuit needs to send, during data processing, input data for convolutional computation with the convolutional kernel to an input buffer in the hardware circuit through a drive program or other hardware logics. The input buffer inputs input data corresponding to each row into a corresponding row. The input data is transmitted between the computing units corresponding to the row, and the computing units perform a convolutional computation on the input data and the pre-stored convolutional kernel, outputs an accumulated convolutional computation result in each column, and stores the result in an output buffer. The output buffer provides the result to other hardware algorithm circuits for subsequent processing. The convolutional computing accelerator provided according to the embodiment of this application does not need to occupy memory resources and processor computing resources, and has a faster computation rate through the hardware circuit, thereby increasing a data processing rate.

In some embodiments, the computing unit may be a digital signal processor (DSP). When m≥2, a computing matrix in the convolutional computing accelerator may be regarded as a two-dimensional matrix composed of DSP.

Figure 4:
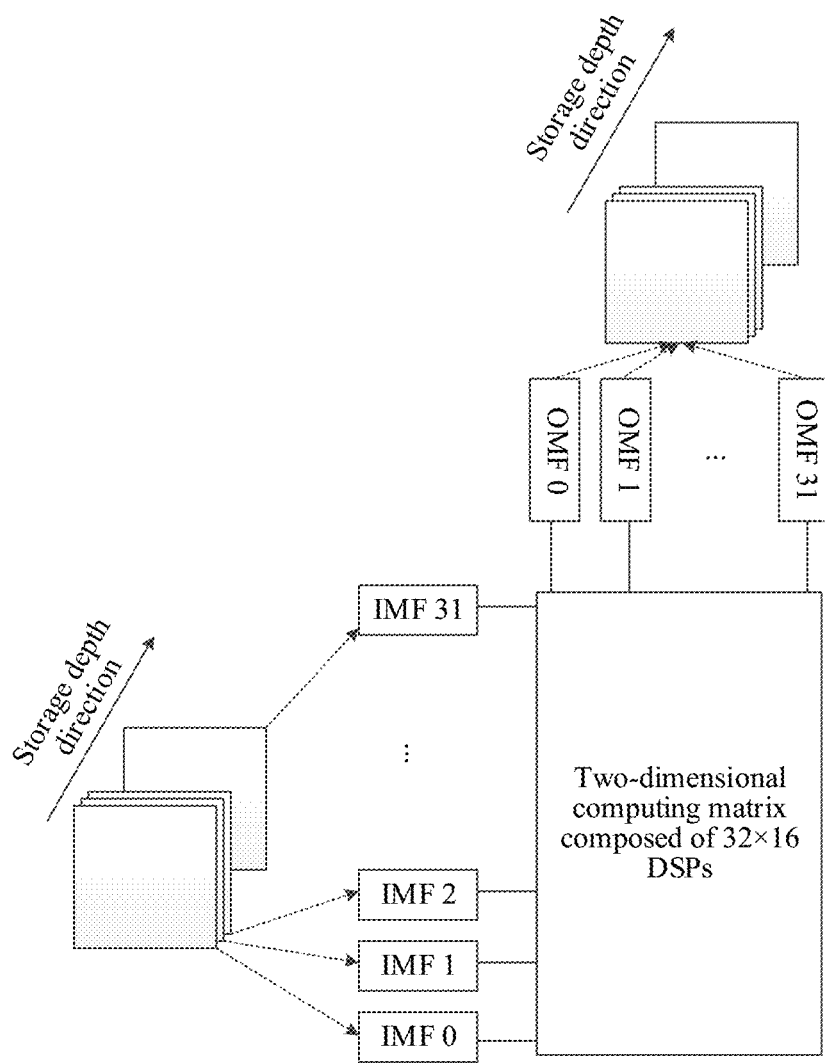
FIG. 4 is a schematic diagram of an input and an output of the convolutional computing accelerator involved in the embodiment shown in FIG. 3.

For example, a two-dimensional computing matrix composed of 32×16 (that is, m is 32 and n is 16) DSPs performs a convolutional computation in a CNN process. Referring to FIG. 4, a schematic diagram of an input and an output of a convolutional computing accelerator involved in an embodiment of this application is shown. A left column in FIG. 4 is an input feature map (IFM) buffer equivalent to the foregoing input buffer, and an upper row is an output feature map (OFM) buffer equivalent to the foregoing output buffer. The feature map is picture data composed of features extracted from a currently processed image during processing of an image through CNN.

In FIG. 4, the input feature map buffer may be specifically implemented as a 32-block random access memory (block RAM) to be configured to store feature map data in a CNN network. Each block RAM stores data of a feature map in a depth direction. Data of the block RAM is stored in a row. Each block RAM may cache data of a kernel_size+1 row (an advantage of storage of the data of the kernel_size+1 row is that only minimum required data is stored, reducing consumption storage resources). kernel_size is a size of a convolutional kernel in CNN. For example, assuming that the convolutional kernel is a 3*3 matrix, kernel_size is 3.

In FIG. 4, the output feature map buffer may be specifically implemented as a 32-block random access memory to be configured to store data after convolution. Each block random access memory caches an output after computation of a set of convolutional kernels. A depth of the block random access memory may be selected according to an actual output size of the network in CNN. In FIG. 4, every two block RAMs in the output feature map buffer correspond to the foregoing one output buffer. In other words, a last row of computing units may output convolutional results corresponding to two different sets of convolutional kernels to the corresponding block RAM.

In some embodiments, in one embodiment of this application, each computing unit 102a may include at least one multiplier. The multiplier is configured to perform a convolutional computation on the received input data with and the pre-stored convolutional kernel.

In some embodiments, each computing unit 102a may further include an adder. The adder is configured to add a convolutional computation result of the multiplier in the computing unit and a convolutional computation result sent by a corresponding same column of computing units in a previous row of computing units to obtain an updated convolutional computation result. The updated convolutional computation result is outputted to a corresponding same column of computing unit in a next row of computing units. After convolution and accumulation of all data are performed in a last row, an accumulated result is outputted to a correspondingly connected output buffer 104a.

Figure 5:
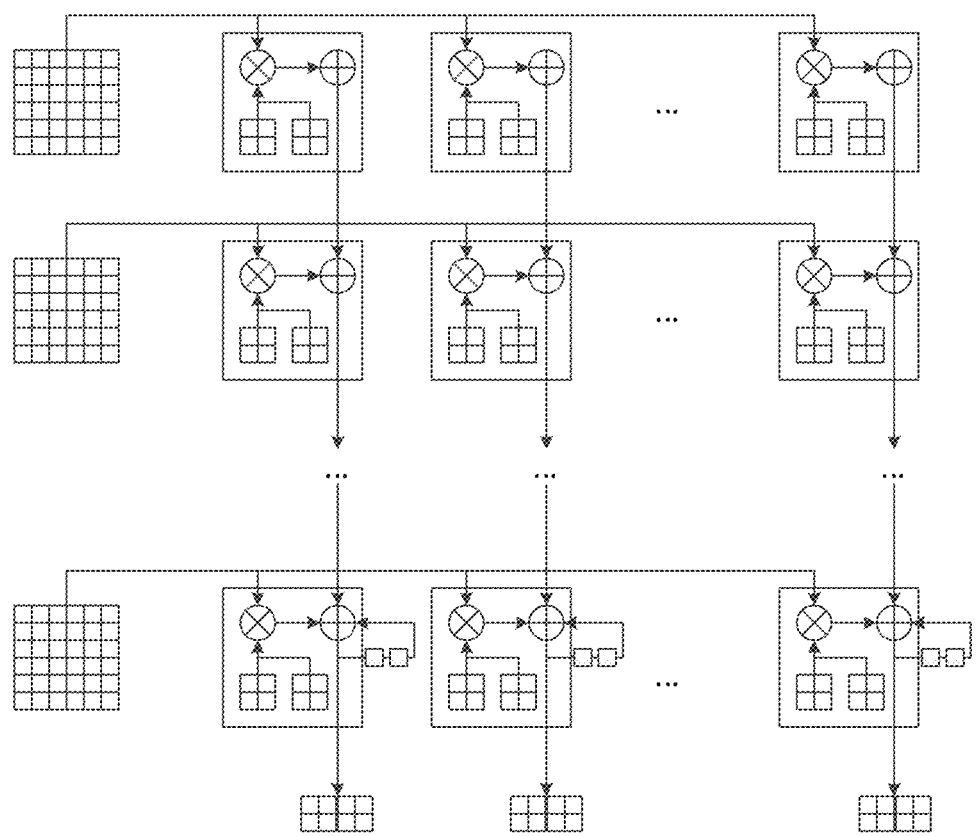
FIG. 5 is a schematic diagram of internal implementation of the convolutional computing accelerator involved in the embodiment shown in FIG. 3.

For example, referring to FIG. 5, a schematic diagram of internal implementation of a convolutional computing accelerator involved in one embodiment of this application is shown. For example, 32*16 (that is, m is 32 and n is 16) DSPs perform convolutional computations in a CNN process. As shown in FIG. 5, in a horizontal direction, input feature map data of computing unit (row, 0)~computing unit (row, 15) in different columns is shared. After a first computing unit reads data from the input feature map once, the first computing unit shares the data with other computing units in the same row in a pipeline manner. Two benefits are obtained in such design: first, the same row of computing units only needs to store one piece of data of the input feature map shared by all convolutional kernels in the same row of computing units, reducing consumption of resources (cache resources and power consumption) and an input data bandwidth; second, a data flow is more regular, and a pipeline layout reduces complexity of routing and increases a design frequency.

In FIG. 5, in a vertical direction, convolutional computation results of computing unit (0, column)~computing unit (31, column) in different rows are cascaded to achieve a computation of a convolution sum. 32 convolutions in each column in the vertical direction are accumulated and computed in parallel. Total delay: (32+kernel_size*kernel_size) cycles. Throughout: a convolution sum result is output in a column direction in each kernel_size*kernel_size cycle.

In some embodiments, each computing unit in the computing matrix 102 pre-stores at least two convolutional kernels. Each computing unit 102a in the computing matrix 102 is configured to successively perform a convolutional computation on the received input data and the at least two convolutional kernels in a first clock cycle.

In a practical application, due to a difference in a working clock frequency of a data input logic and a working clock frequency of a computation logic of a computing unit (such as FPGA DSP), the working clock frequency of the computing unit is often higher. A duration (that is, the foregoing first clock cycle) required for the computing unit to store data once may be several times greater than a duration required for one convolutional computation. If the computing unit performs the convolutional computation only once during a data storage process, the computing unit needs to wait for completion of next input data storage after performing the convolutional computation. In order to further increase efficiency of the convolutional computation of the computing matrix, in one embodiment of this application, two or more convolutional kernels may be pre-stored in one computing unit. While the computing unit is completing storage of one piece of input data, the computing unit may successively perform a convolutional computation on the input data and two or more convolutional kernels, thereby increasing operation efficiency of the convolutional computation.

In some embodiments, a duration of the first clock cycle is not shorter than a sum of a pre-set number of durations of second clock cycles. The pre-set number is a number of convolutional kernels pre-stored in the computing unit 102a. Each convolutional kernel corresponds to one second clock cycle. Each computing unit 102a in the computing matrix is configured to perform a convolutional computation on the received input data and the convolutional kernel during a second clock cycle corresponding to each convolutional kernel.

In one embodiment of this application, two clock cycles may be set in the computing unit. One clock cycle is a cycle (that is, the foregoing first clock cycle) in which the computing unit receives input data once, and the other clock cycle is a cycle (that is, the foregoing second clock cycle) in which the computing unit performs a convolutional computation on one piece of input data and a convolutional kernel. In addition, the first clock cycle needs to be not shorter than q times the second clock cycle (q is the foregoing pre-set number, and Q is an integer greater than or equal to 2). In other words, in one first clock cycle, the computing unit may be sufficient to perform at least q convolutional computations. In each second clock cycle, the computing unit performs a convolutional computation on the input data stored in a local register in a previous first clock cycle and a locally stored convolutional kernel, until convolutional computations are performed on pre-stored q convolutional kernels and the input data, respectively.

For example, the first clock cycle is 2 ns, and the second clock cycle is 1 ns. Assuming that input data stored to a computing unit in a previous 2 ns is data A, the computing unit pre-stores two convolutional kernels. In a first 1 ns of the current 2 ns, the computing unit performs a convolutional computation on the data A and a first one of the two convolutional kernels. In a last 1 ns of the current 2 ns, the computing unit performs the convolutional computation on the data A and a second one of the two convolutional kernels.

Figure 6:
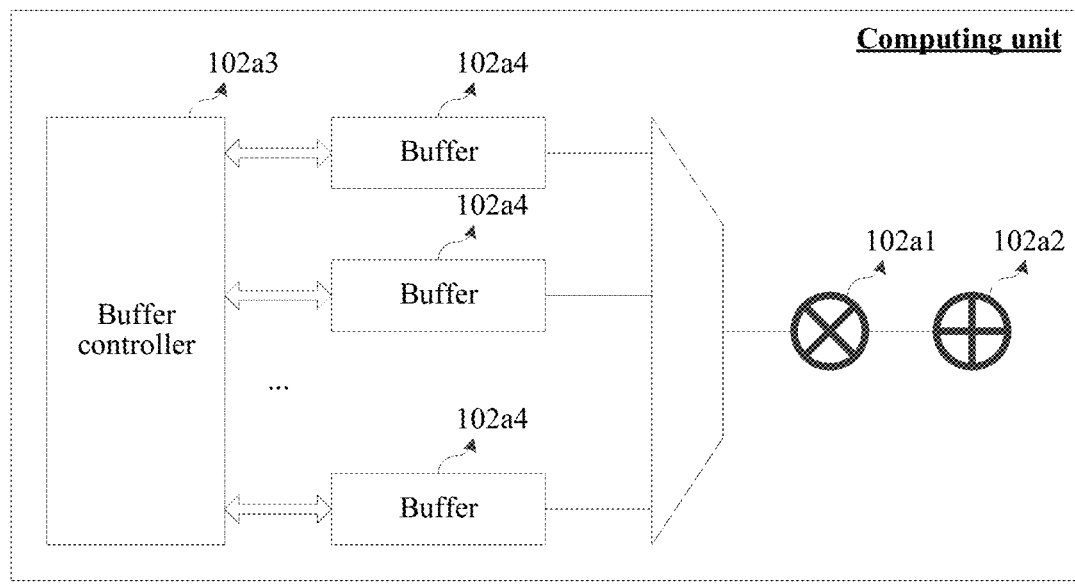
FIG. 6 is a schematic diagram of a circuit connection of a computing unit involved in the embodiment shown in FIG. 3.

In some embodiments, referring to FIG. 6, a schematic diagram of a circuit connection of a computing unit involved in an embodiment of this application is shown. As shown in FIG. 6, one computing unit 102a includes a buffer controller 102a3 and q buffers 102a4 apart from a multiplier 102a1 and an adder 102a2. The q buffers 102a4 cache one of q convolutional kernels, respectively. In addition, the buffer controller 102a3 is connected to the q buffers 102a4, respectively. The q buffers 102a4 are directly or indirectly connected to the multiplier 102a1, respectively (q buffers 102a4 in FIG. 6 are indirectly connected to the multipliers 102a1, respectively). The multiplier 102a1 is connected to the adder 102a2. In one second clock cycle, the buffer controller 102a3 is configured to control one of the q buffers 102a4 to output the stored convolutional kernel to the multiplier 102a1.

For example, in a previous second clock cycle, the buffer controller 102a3 controls a convolutional kernel buffered in the first buffer 102a4 to be input to the multiplier 102a1. In a later second clock cycle, the buffer controller 102a3 controls the convolutional kernel buffered in the second buffer 102a4 to be input to the multiplier 102a1. The rest can be deduced by analogy.

In particular, assuming that in FIG. 5, a working frequency of DSP is 550 MHz, an update frequency of the input feature map is 275 MHz, that is, an update cycle (that is, the foregoing first clock cycle) of the feature map is twice greater than the working cycle (that is, the foregoing second clock cycle) of the DSP. In order to avoid a waste of DSP computing resources, there may be two convolutional kernels stored in each DSP. The two convolutional kernels are multiplexed in time division. A reason for such design is because the input feature map is controlled to be stored for 2 second clock cycles in each column. Therefore, the two convolutional kernels may multiplex the data in time division, achieving the "full speed operation" of the DSP, thereby increasing a DSP time utilization. The DSP may achieve 100% time utilization provided that the input data is continuous, increasing working efficiency of a multiplication circuit and an addition circuit.

According to different positions of the computing units in the computing matrix, three types of computing units need to be implemented in the convolutional computing accelerator. Basic circuits of the three computing units are the same, and are different in output only. In other words, in each column of a two-dimensional computing matrix, inputs of adders of a first row of computing units, a last row of computing units (that is, the foregoing second computing units), and a middle row of computing units are different.

In particular, In some embodiments, a third computing unit in the computing matrix 102 is further configured to output, to a next computing unit in a corresponding column, a convolutional computation result obtained by performing a convolutional computation in a previous first clock cycle. The third computing unit is any computing unit in the first row of the computing matrix 102.

Figure 7:
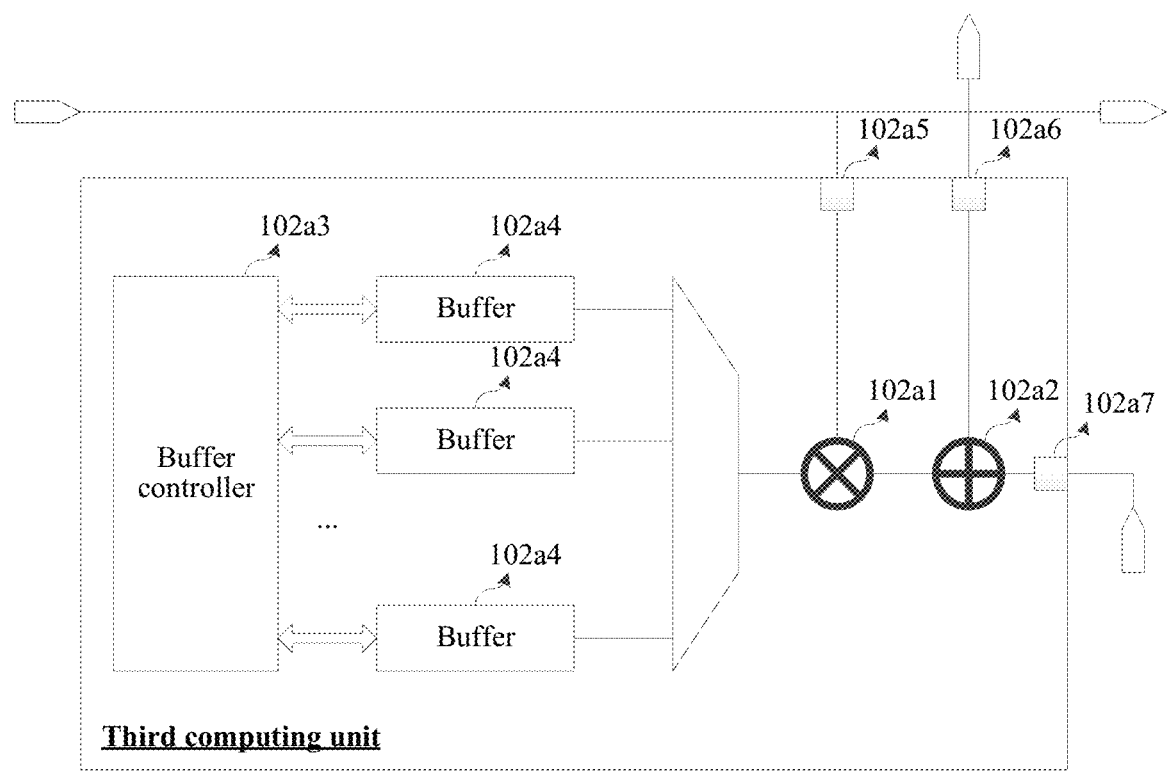
FIG. 7 is a schematic diagram of a circuit connection of a third computing unit involved in the embodiment shown in FIG. 3.

In some embodiments, referring to FIG. 7, a schematic diagram of a circuit connection of a third computing unit involved in an embodiment of this application is shown. As shown in FIG. 7, each third computing unit in the computing matrix is any computing unit in the first row of computing units. In addition to a buffer controller 102a3 and q buffers 102a4, the third computing unit further includes: a first input interface 102a5, a multiplier 102a1, and first output interface 102a6.

The first input interface 102a5 is configured to receive an input buffer corresponding to a computing unit in a first row or input data sent by a previous computing unit in the same row.

The multiplier 102a1 is configured to perform a convolutional computation on input data received by the first input interface 102a5 in a previous first clock cycle and a pre-stored convolutional kernel.

The first output interface 102a6 is configured to output a convolutional computation result obtained through computation by the multiplier 102a1 to a next computing unit of a computing unit in the same column.

In some embodiments, the third computing unit is further configured to add, before outputting a convolutional computation result obtained by performing a convolutional computation in the previous first clock cycle to a next computing unit in a corresponding column, the convolutional computation result obtained by performing the convolutional computation in the previous first clock cycle to initial accumulated data, to obtain an addition computation result. The third computing unit is configured to output the foregoing addition computation result, as an updated convolutional computation result, to the next computing unit in the corresponding column in a next first clock cycle when outputting, to the next computing unit in the corresponding column, the convolutional computation result obtained by performing the convolutional computation in the previous first clock cycle.

For example, as shown in FIG. 7, the third computing unit further includes: a second input interface 102a7 and an adder 102a2.

The second input interface 102a7 is configured to receive the initial accumulated data.

The adder 102a2 is configured to add, in the current first clock cycle, the convolutional computation result obtained by the multiplier 102a1 in the previous first clock cycle to the initial accumulated data before outputting, in the first output interface 102a6, the convolutional computation result obtained by the multiplier in the previous first clock cycle to the next computing unit of the computing unit in the same column.

The first output interface 102a6 is configured to use the addition computation result of the adder 102a2 as an updated convolutional computation result and output the addition computation result to the next computing unit of the computing unit in the same column in a next first clock cycle.

In one embodiment of this application, a first row (corresponding to the third computing unit) in the computing matrix does not have a cascade input (that is, a convolutional computation result input by a computing unit in a previous row). Therefore, in one embodiment of this application, an input of an adder in the first row of the computing matrix has an initial value of bias. The initial value (that is, the foregoing initial accumulated value) may be 0.

In some embodiments, a second computing unit in the computing matrix 102 is further configured to add, before storing the accumulated convolutional computation result to a second cache, a convolutional computation result obtained by performing a convolutional computation in the previous first clock cycle to the convolutional computation result sent by a previous computation unit in the previous first clock cycle, to obtain an accumulated convolutional computation result.

Figure 8:
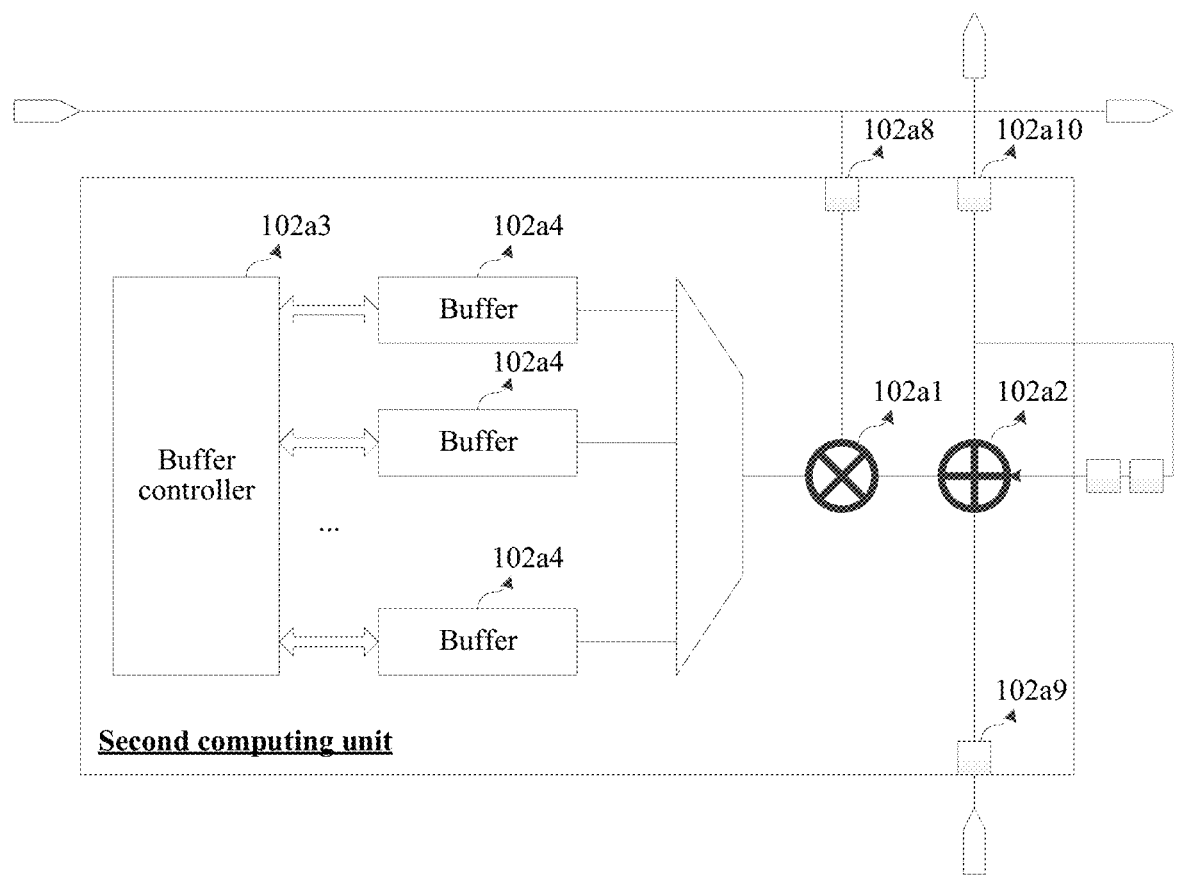
FIG. 8 is a schematic diagram of a circuit connection of a second computing unit involved in the embodiment shown in FIG. 3.

For example, referring to FIG. 8, a schematic diagram of a circuit connection of a second computing unit involved in an embodiment of this application is shown. As shown in FIG. 8, each second computing unit in a computing matrix is any computing unit in a last row of computing units of the computing matrix. In addition to a buffer controller 102a3 and q buffers 102a4, the second computing unit further includes: a third input interface 102a8, a multiplier 102a1, a fourth input interface 102a9, an adder 102a2, and a second output interface 102a10.

The third input interface 102a8 is configured to receive an input buffer corresponding to a computing unit in a last row or input data sent by a previous computing unit in the same row.

The multiplier 102a1 is configured to perform a convolutional computation on input data received by the third input interface in a previous first clock cycle and a convolutional kernel pre-stored in the second computing unit.

The fourth input interface 102a9 is configured to receive a convolutional computation result of a previous computing unit in the same column.

The adder 102a2 is configured to add the convolutional computation result obtained by the multiplier 102a1 in a previous first clock cycle and a convolutional computation result sent by a previous computing unit in the same column in the previous first clock cycle, to obtain an addition computation result.

The second output interface 102a10 is configured to use the addition computation result of the adder as an accumulated convolutional computation result and output the accumulated convolutional computation result obtained by the adder 102a2 in the previous first clock cycle to an output buffer connected to the second computing unit.

In one embodiment of this application, an input of the accumulated result is increased to an input of the adder in a last row (corresponding to the second computing unit) in the computing matrix to complete accumulation.

In some embodiments, when q≥2, the adder accumulates convolutional computation results of a plurality of sets of different convolutional kernels, respectively, and simultaneously sends the accumulated convolutional computation results corresponding to the sets of convolutional kernels to an output buffer connected to the convolutional kernels.

In some embodiments, a fourth computing unit in the computing matrix 102 is further configured to add the convolutional computation result obtained by performing a convolutional computation in a previous clock cycle and a convolutional computation result sent by a previous computing unit in the previous clock cycle, to obtain an addition computation result; and output the addition computation result, as an updated convolutional computation result, to a next computing unit in a corresponding column in a next first clock cycle. The fourth computing unit is any other computing unit than computing units in the first row and the last row of the computing matrix 102.

Figure 9:
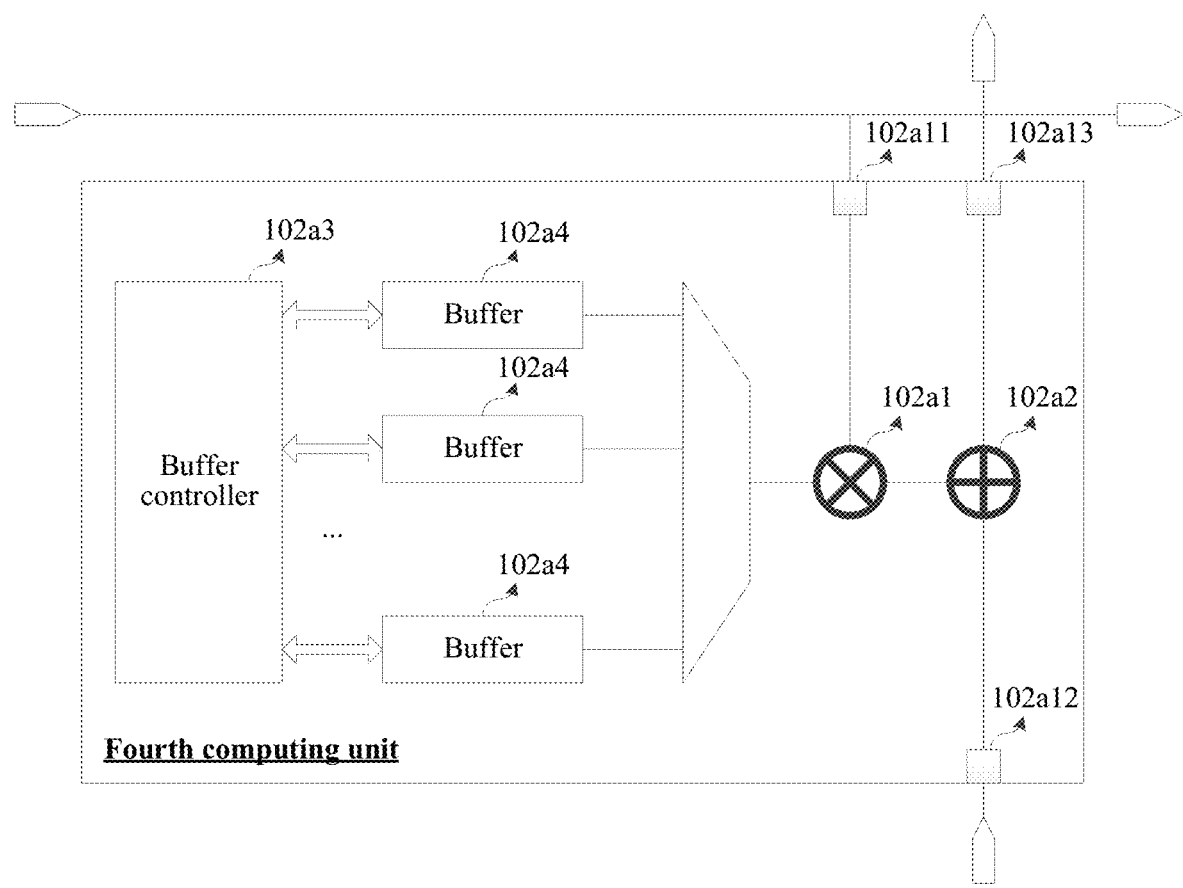
FIG. 9 is a schematic diagram of a circuit connection of a fourth computing unit involved in the embodiment shown in FIG. 3.

For example, referring to FIG. 9, a schematic diagram of a circuit connection of a fourth computing unit involved in an embodiment of this application is shown. As shown in FIG. 9, when m≥3, each fourth computing unit in a computing matrix 102 is any computing unit in a $p^{th}$ row of computing units, 2≤p≤m−1. In other words, the fourth computing unit is any other computing unit than computing units in the first row and the last row of the computing matrix. In addition to a buffer controller 102a3 and q buffers 102a4, the fourth computing unit includes: a fifth input interface 102a11, a multiplier 102a1, a sixth input interface 102a12, an adder 102a2, and a third output interface 102a13.

The fifth input interface 102a11 is configured to receive input data sent by an input buffer corresponding to a computing unit in the $p^{th}$ row or a previous computing unit in the same row.

The multiplier 102a1 is configured to perform a convolutional computation on input data received by the fifth input interface 102a11 in a previous first clock cycle and a convolutional kernel pre-stored in the fourth computing unit.

The sixth input interface 102a12 is configured to receive a convolutional computation result sent by a previous computing unit (that is, a computing unit in a p−1th row connected to the fourth computing unit) in the same column.

The adder 102a2 is configured to add the convolutional computation result obtained by the multiplier 102a1 in a previous first clock cycle and a convolutional computation result sent by a previous computing unit in the same column in the previous first clock cycle, to obtain an addition computation result.

The third output interface 102a13 is configured to output the addition computation result obtained by the adder 102a12 in the previous first clock cycle, as an updated convolutional computation result, to a next computing unit (that is, a computing unit in a $p+1^{th}$ row of computing units connected to the fourth computing unit) in the same column.

In one embodiment of this application, an adder in a middle row (corresponding to the fourth computing unit) other than a first row and a last row in the computing matrix has a cascade input from an output of a computing unit in a previous row. In this case, the adder in a computing unit in the middle row accumulates the convolutional computation result of the computing unit in the previous clock cycle and an output from a computing unit in a previous row in a previous clock cycle, and outputs an accumulated result to a corresponding computing unit in a next row in a next first clock cycle.

In some embodiments, in one embodiment of this application, because a number of computing units included in one computing matrix is limited, that is, a number of rows of a unit and a number of computing units included in each row of computing units are fixed. When an amount of input data for convolutional computation in a certain convolutional computation task is large, the input data may be split. The input data is split into two or more sets of data with a small amount of data, so that each set of data is inputted into a convolutional computing accelerator, respectively, and the convolutional computation results are combined.

For example, when used in CNN processing, different CNN models may be split according to different layers in CNN and resolution and a depth of each convolutional computation in the same layer by using proper input data, to input, to the same convolutional computing accelerator, input data of different CNN models, so that the same convolutional architecture is adapted to different convolutional computations.

In some embodiments, for one computing unit 102a, in one convolutional computation task, a pre-stored convolutional kernel of the computing unit 102a remains unchanged. A controller 101 is further configured to input, to each computing unit 102a, a convolutional kernel corresponding to a next convolutional computation task during execution of the convolutional computation task. A convolutional kernel of the convolutional computation task stored in each computing unit 102a is input by the controller 101 in a previous convolutional computation task.

Figure 10:
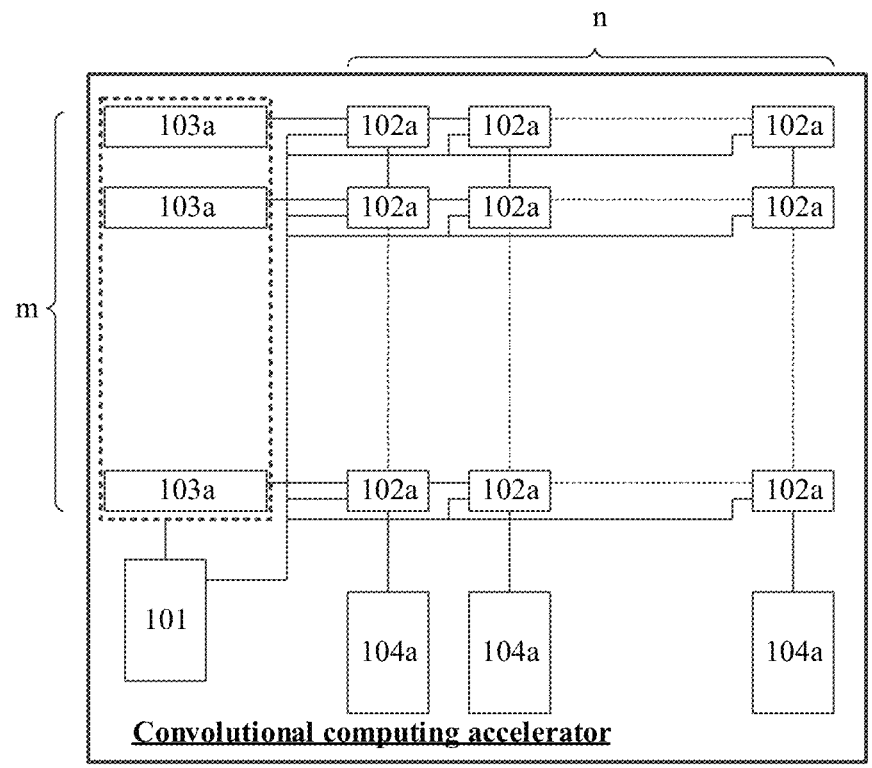
FIG. 10 is a schematic structural diagram of another convolutional computing accelerator involved in the embodiment shown in FIG. 3.

For example, referring to FIG. 10, a schematic structural diagram of another convolutional computing accelerator involved in an embodiment of this application is shown. As shown in FIG. 10, each computing unit 102a is connected to the controller 101.

The controller 101 is configured to input, to each computing unit 102a, a convolutional kernel corresponding to a next convolutional computation task when the convolutional computing accelerator executes a current convolutional computation task.

In one embodiment of this application, before the convolutional computing accelerator starts to execute a convolutional computation task, the controller 101 pre-stores, to each computing unit, a convolutional kernel used by the convolutional computation task. In order to shorten preparation time before execution of the convolutional computation task (including time for storing the convolutional kernel), in one embodiment of this application, when the convolutional computing accelerator executes the convolutional computation task, the controller 101 may also synchronously stores, to each computing unit, a convolutional kernel used in a next convolutional computation task, so as to shorten time for loading the convolutional kernel before the convolutional computation task and increase computation efficiency.

In particular, for example, in each convolutional computation task, each computing unit performs a convolutional computation on input data and each of pre-stored q convolutional kernels in a time division manner in one first clock cycle. In one embodiment of this application, two sets of buffers may be set in each computing unit. Each set of buffers includes q buffers 102a4 respectively. If a first set of buffers in the two sets of buffers is used in the convolutional computation task, when the convolutional computing accelerator performs a previous convolutional computation task according to convolutional kernels in the q registers 102a4 in the second set of buffers, the controller 101 stores q convolutional kernels to the first set of buffers. Correspondingly, when the convolutional computing accelerator performs the convolutional computation task according to the convolutional kernels in the q buffers 102a4 in the first set of buffers, the controller 101 stores, to the second set of buffers, q convolutional kernels corresponding to a next convolutional computation task.

Based on the foregoing, in the convolutional computing accelerator shown in one embodiment of this application, two adjacent computing units included in each row of the computing matrix are connected. When convolutional computation is performed, input data corresponding to each row of computing units is successively input to each computing unit in the row of computing units in a pipeline manner, and the same row of computing units perform a convolutional computation on the input data and pre-stored convolutional kernels. In other words, at least two computing units in the same row multiplex same input data, and only one input channel is needed, thereby reducing the buffer capacity and input bandwidth requirements of the computing matrix, and improving expandability of the computing matrix.

In addition, in the convolutional computing accelerator shown in one embodiment of this application, in one computing unit, according to a multiple relationship between a first clock cycle stored in the input data and a second clock cycle in which the computing unit performs a convolutional computation, two sets or more of convolutional kernels may be set. In the first clock cycle, the computing unit may successively perform the convolutional computation on the input data and the two or more sets of convolutional kernels, thereby increasing a resource utilization of the computing unit and efficiency of the convolutional computation, further increasing a data processing rate.

What's more, in the convolutional computing accelerator shown in one embodiment of this application, the controller inputs, to each computing unit, a convolutional kernel corresponding to the convolutional computation task when the convolutional computing accelerator performs one convolutional computation task before the convolutional computation task, shortening time of preparation before the convolutional computation task, thereby improving the efficiency of the convolutional computation.

Figure 11:
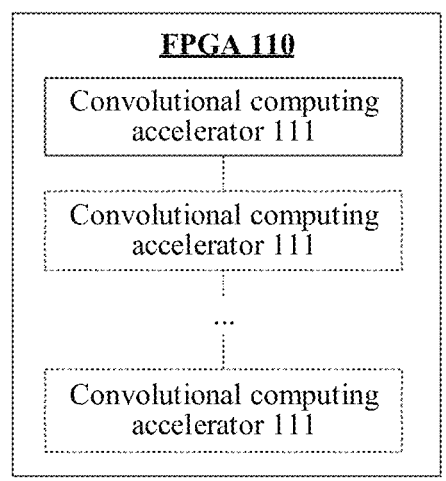
FIG. 11 is a schematic structural diagram of an FPGA according to one embodiment of the present disclosure.

FIG. 11 is a schematic structural diagram of a field programmable gate array (FPGA) according to one embodiment of the present disclosure. As shown in FIG. 11, in one embodiment of this application, one FPGA 110 may include at least one convolutional computing accelerator 111 shown in FIG. 1.

In one embodiment of this application, the convolutional computing accelerator may be implemented by the field programmable gate array (FPGA), that is, one FPGA may include at least one of the convolutional computing accelerators.

Figure 12:
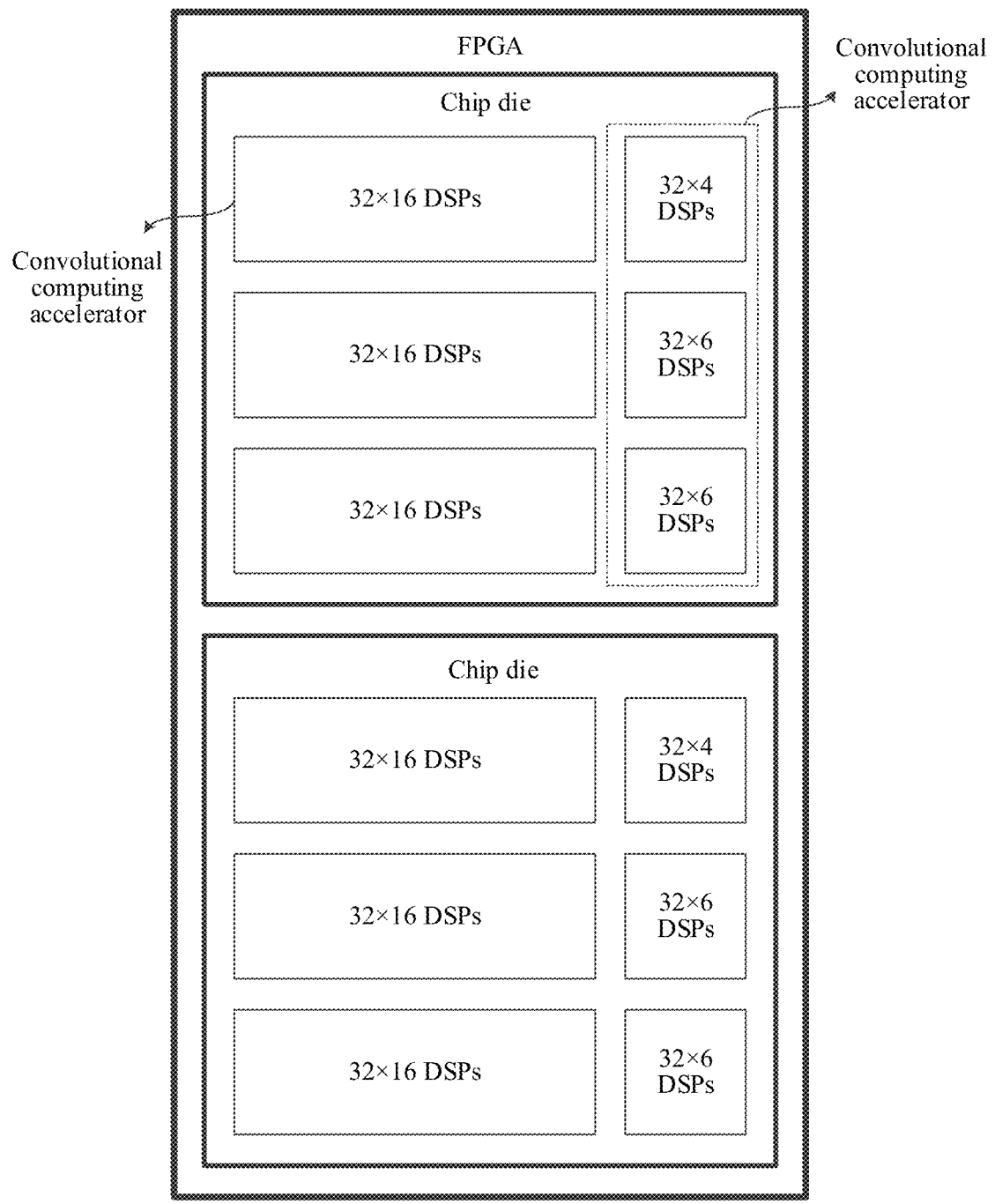
FIG. 12 is a schematic diagram of a division of an FPGA involved in the embodiment shown in FIG. 11.

For example, m=32 and n=26, referring to FIG. 12, a schematic diagram of a division of an FPGA involved in an embodiment of this application is shown. As shown in FIG. 12, FPGA includes two chip dies packed in one chip, the two chip dies being arranged up and down. Logically, eight two-dimensional computing matrices (that is, m*n computing units in the computing matrix) including 32×16 DSPs are designed in a piece of FPGA, and four two-dimensional computing matrices are disposed on each chip die. Actually, due to a limitation of a DSP physical layout of the FPGA, the eight two-dimensional computing matrices may be logically split into 12 physical two-dimensional computing matrices, and six physical two-dimensional computing matrices are disposed on each chip die. Three 32×16 physical two-dimensional computing matrices respectively compose one convolutional computing matrix. One physical two-dimensional computing matrix composed of 32×4 DSPs and two physical two-dimensional computing matrices composed of 32×6 DSPs compose one convolutional computing matrix. In the design shown in FIG. 11, 4096 (accounting for 73%) DSPs in the FPGA are utilized to split eight convolutional computing matrices to complete acceleration in parallel. Each convolutional computing matrix is designed as 512 DSPs. Each computing matrix is one two-dimensional computing matrix similar to a rectangle and is composed of 32×16 DSP nodes. Each DSP node composes one computing unit. The computing unit is composed of a data storage unit (that is, the foregoing buffer) and one DSP computing unit (that is, the foregoing multiplier and adder) to complete most basic convolution and addition computation functions. The computing unit implements 16-bit fixed-point computation.

Figure 13:
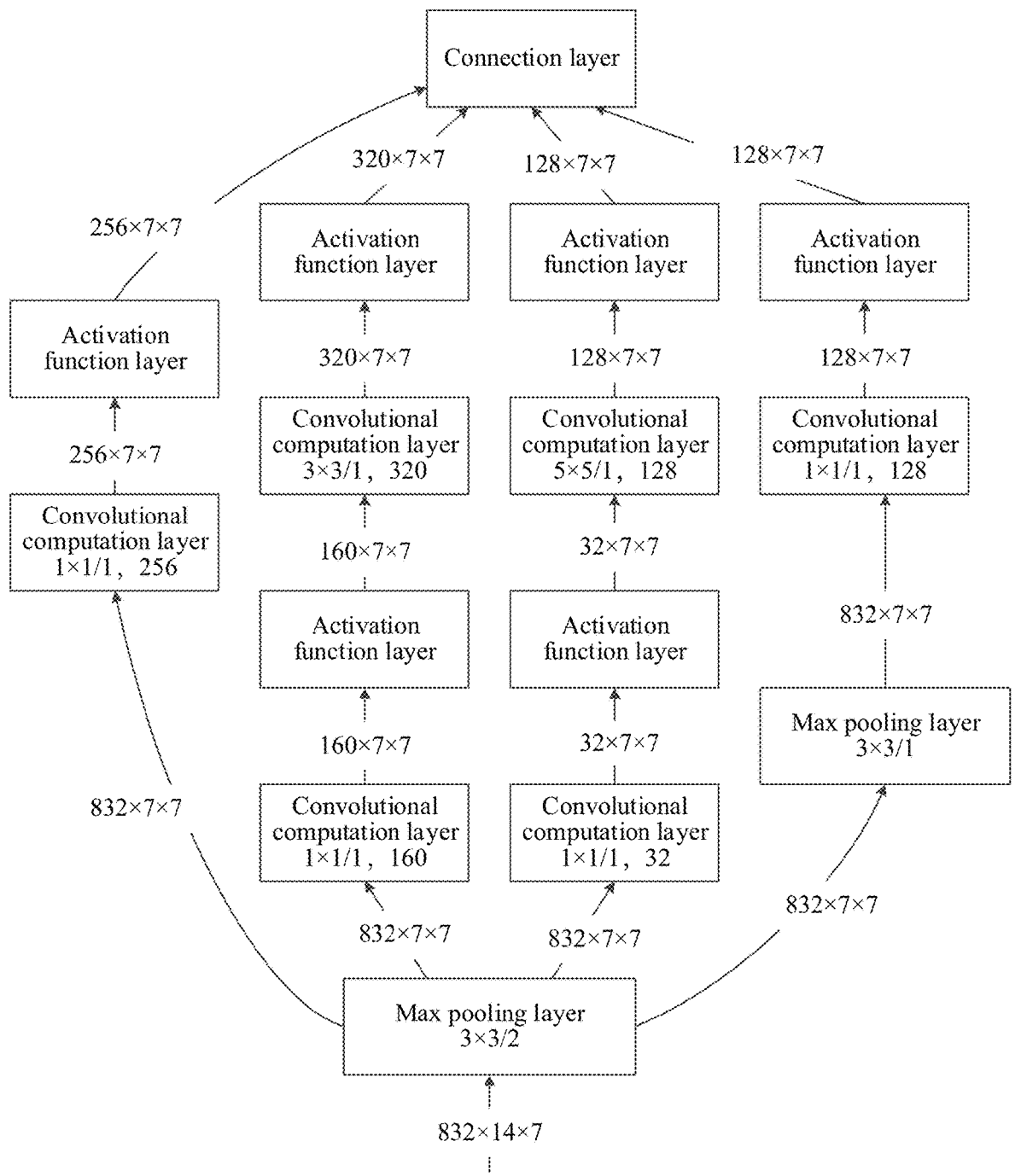
FIG. 13 is a network structure diagram of a CNN model involved in the embodiment shown in FIG. 11.
Figure 14:
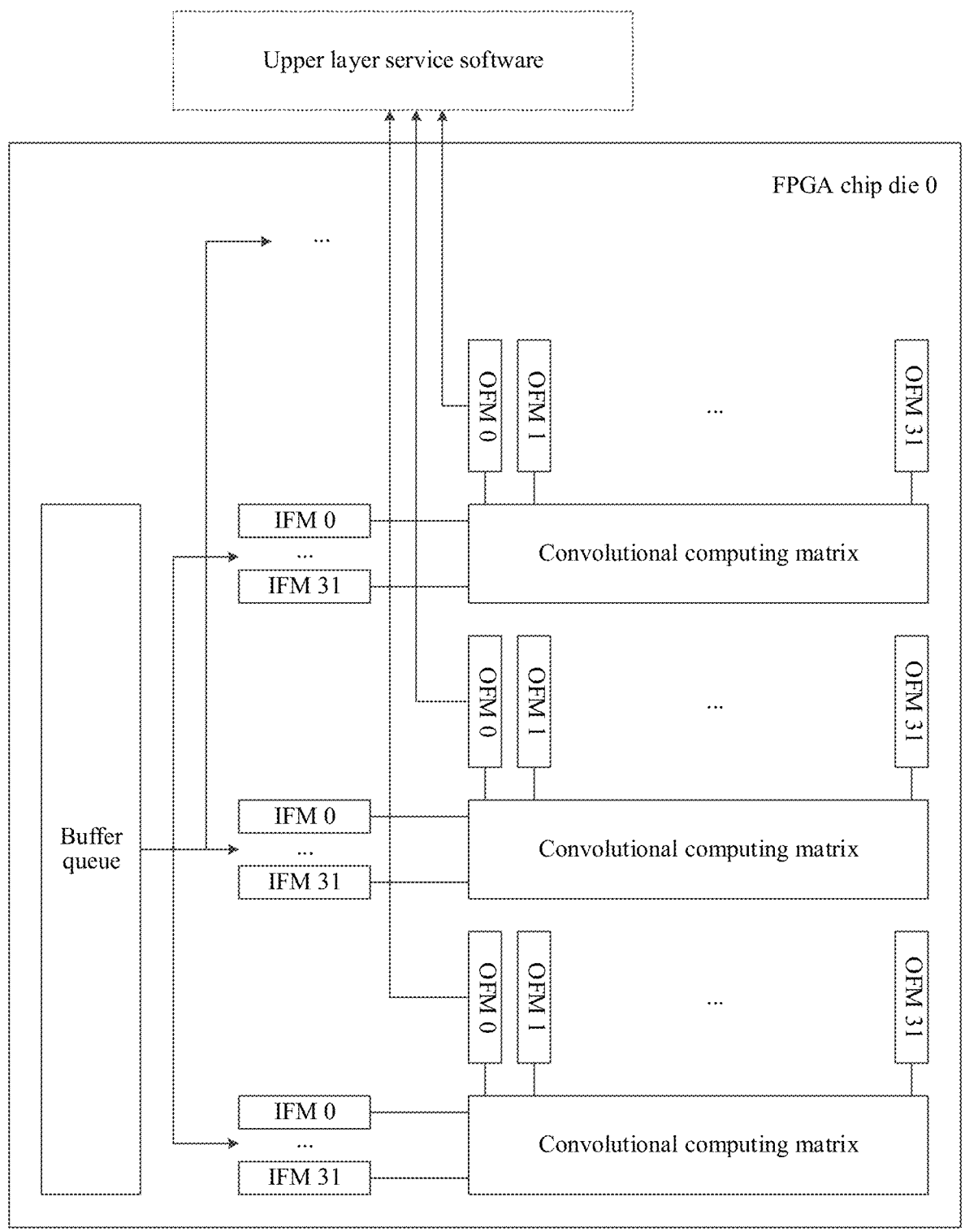
FIG. 14 is a hardware structure diagram of an FPGA involved in the embodiment shown in FIG. 11.

The embodiment of this application may be applied to FPGA hardware acceleration of a picture detection service. For example, a CNN model used in a picture detection service is googlenet V1 used for acceleration of filtering of a picture uploading service. Referring to FIG. 13, a network structure diagram of a CNN model involved in one embodiment of this application is shown. A network structure shown in FIG. 13 is a network structure of googlenet V1. The network structure is similar to other deep neural networks and includes a plurality of layers. Each layer includes a plurality of convolutional computations. The convolutional computation is a computation part with a largest proportion in an entire network. Accordingly, for example, the FPGA is implemented as a hardware architecture of the googlenet V1. Referring to FIG. 14, a hardware structure diagram (including one FPGA chip die) of an FPGA involved in an embodiment of this application is shown. As shown in FIG. 14, there are several convolutional computing matrices in FPGA chip die 0. The FPGA chip die 0 inputs 32 feature maps (that is, IFM0~IFM31 in FIG. 14) to each convolutional computing matrix through a cache queue, and outputs 32 feature maps (that is, OFM0~OFM31 in FIG. 14). The convolutional computing matrices complete a CNN multiply-accumulate computation in parallel and outputs a multiply-accumulate computation result to upper-layer business software.

In the solution shown in one embodiment of this application, convolutional operation hardware in a CNN process may be accelerated based on an FPGA multiply-accumulate computing architecture. Through a proper data path and storage design, the input data may be multiplexed greatly, reducing a data input bandwidth of an entire operating engine. In addition, in one embodiment of this application, physical resources of FPGA and physical routing of DSP are fully considered, so that a working frequency of the DSP may reach 550 MHz. In addition, in the solution provided by the embodiment of this application, a plurality of convolutional kernels may be pre-stored in the DSP. A time utilization of the internal DSP resource may reach 100% provided that the input is not a bottleneck. The FPGA architecture provided by the embodiment of this application may be expanded according to a number of DSP resources in the FPGA to achieve peak computing capabilities of different requirements.

Figure 15:
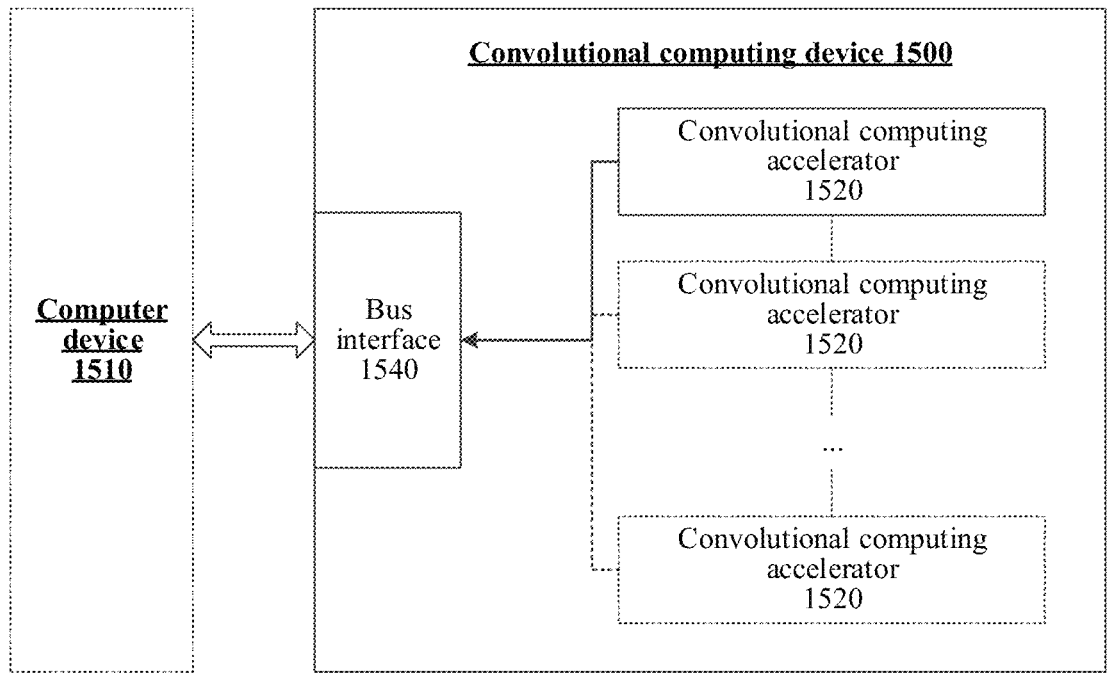
FIG. 15 is a schematic structural diagram of a convolutional computing device according to one embodiment of the present disclosure.

FIG. 15 is a schematic structural diagram of a convolutional computing device according to one embodiment of the present disclosure. As shown in FIG. 15, a convolutional computing device 1500 includes: at least one convolutional computing accelerator 1520 as shown in FIG. 1.

The at least one convolutional computing accelerator 1520 may be distributed in at least one field programmable gate array FPGA. In other words, each FPGA includes at least one convolutional computing accelerator 1520.

In some embodiments, in one embodiment of this application, the convolutional computing device includes a bus interface 1540. The convolutional computing device is connected to a computer device 1510 via the bus interface 1540.

In some embodiments, the bus interface 1540 may be a peripheral component interconnect (PCI) interface or a PCI express (PCI-E) interface.

The convolutional computing device may be implemented as a board card device. The board card device is connected to a main board of a server or a personal computer through a bus interface, such as the PCI or PCI-E interface, and provided to upper-layer business software through a drive program for use.

Figure 16:
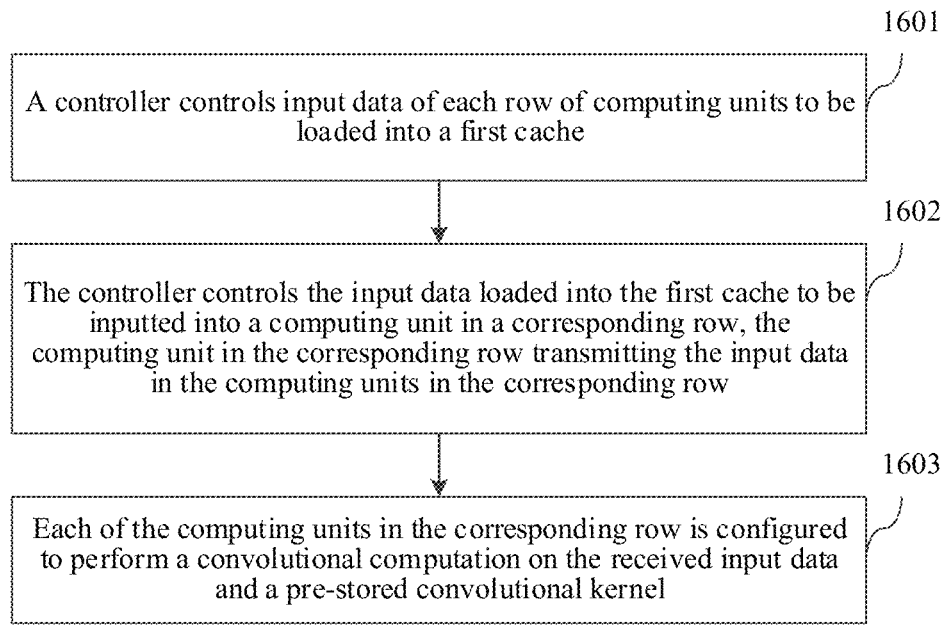
FIG. 16 is a flowchart of a convolutional computing method according to one embodiment of the present disclosure.

FIG. 16 is a method flowchart of a convolutional computing method according to one embodiment of the present disclosure. The method may be applied to the convolutional computing accelerator shown in FIG. 1. As shown in FIG. 16, the convolutional computing method may include the following steps.

Step 1601: A controller controls input data of each row of computing units to be loaded into a first cache.

Step 1602: The controller controls the input data loaded into the first cache to be inputted into a computing unit in a corresponding row, the computing unit in the corresponding row transmitting the input data in the computing units in the corresponding row.

Step 1603: Each of the computing units in the corresponding row is configured to perform a convolutional computation on the received input data and a pre-stored convolutional kernel.

In some embodiments, when the controller controls to input the input data loaded into the first cache into the computing unit in the corresponding row, the controller inputs the input data into a register of a first computing unit in the corresponding row in a first clock cycle.

The first computing unit in corresponding row of computing units inputs the received input data into the register of a next computing unit in the corresponding row in a next first clock cycle. The first computing unit is any computing unit except a last computing unit in the corresponding row.

In some embodiments, each computing unit in the computing matrix receives input data in a first clock cycle, and performs a convolutional computation on the received input data and a pre-stored convolutional kernel in a next first clock cycle.

In some embodiments, each computing unit in the computing matrix pre-stores at least two convolutional kernels.

Each computing unit of the computing matrix successively performs a convolutional computation on the received input data and the at least two convolutional kernels in a first clock cycle.

In some embodiments, a duration of the first clock cycle is not shorter than a sum of a pre-set number of durations of second clock cycles. The pre-set number is a number of convolutional kernels pre-stored in the computing unit. Each convolutional kernel corresponds to one second clock cycle.

Each computing unit in the computing matrix is configured to perform a convolutional computation on the received input data and the convolutional kernel during a second clock cycle corresponding to each convolutional kernel.

In some embodiments, the convolutional computing accelerator further includes a second cache. The computing matrix includes at least two rows of computing units. The at least two rows of computing units form at least two columns. Two adjacent computing units in each column are connected.

A second computing unit in the computing matrix stores an accumulated convolutional computation result to the second cache. The accumulated convolutional computation result is an accumulated result of convolutional computation results of computing units in the corresponding column. The second computing unit is any computing unit in a last row of the computing matrix.

In some embodiments, the second computing unit is further configured to add, before storing the accumulated convolutional computation result to the second cache, the convolutional computation result obtained by performing a convolutional computation in the previous first clock cycle to a convolutional computation result sent by a previous computing unit in the corresponding column in the previous first clock cycle, to obtain the accumulated convolutional computation result.

In some embodiments, a third computing unit in the computing matrix is further configured to output the convolutional computation result obtained by performing the convolutional computation in the previous first clock cycle to a next computing unit in a corresponding column. The third computing unit is any computing unit in the first row of the computing matrix.

In some embodiments, the third computing unit is further configured to add, before outputting a convolutional computation result obtained by performing a convolutional computation in the previous first clock cycle to a next computing unit in a corresponding column, the convolutional computation result obtained by performing the convolutional computation in the previous first clock cycle and initial accumulated data, to obtain an addition computation result.

The third computing unit is configured to output the addition computation result as an updated convolutional computation result to the next computing unit in the corresponding column when outputting the convolutional computation result obtained by performing the convolutional computation in the previous first clock cycle to the next computing unit in the corresponding column.

In some embodiments, a fourth computing unit in the computing matrix is further configured to add the convolutional computation result obtained by performing a convolutional computation in a previous clock cycle and a convolutional computation result sent by a previous computing unit in the previous clock cycle, to obtain an addition computation result; and output the addition computation result, as an updated convolutional computation result, to a next computing unit in a corresponding column in a next first clock cycle. The fourth computing unit is any other computing unit than computing units in the first row and the last row of the computing matrix.

In some embodiments, the computing unit is a digital signal processor (DSP).

For a process of performing the foregoing steps, reference may be made to the process of the convolutional computation and accumulation by the convolutional computing accelerator shown in FIG. 1 or FIG. 3, and the details are not described herein again.

In one embodiment of the present disclosure, a non-transitory computer readable storage medium including instructions is further provided, for example, a memory including at least one instruction, at least one program, a code set or an instruction set, and the at least one instruction, the at least one program, the code set or the instruction set may be executed by a controller to perform all or some of the steps performed by the controller or the computing unit in the method shown in the embodiment of FIG. 16. For example, the non-transitory computer readable storage medium may be a ROM, a RAM, a CD-ROM, a magnetic tape, a floppy disk, an optical data storage device, or the like.

After considering the specification and practicing this application, a person skilled in the art would easily conceive of other implementations of this application. This application is intended to cover any variation, use, or adaptive change of this application. These variations, uses, or adaptive changes follow the general principles of this application and include common general knowledge or common technical means in the art that are not disclosed in this application. The specification and the embodiments are considered as merely exemplary, and the real scope and spirit of this application are pointed out in the following claims.

It is to be understood that this application is not limited to the precise structures described above and shown in the accompanying drawings, and various modifications and changes can be made without departing from the scope of this application. The scope of this application is limited only by the appended claims.

What is claimed is:

1. A convolutional computing accelerator, comprising: a controller, a computing matrix, and a first cache,
   the computing matrix comprising at least one row of computing units, the at least one row of computing units comprising at least two computing units, wherein each of the at least two computing units is configured to receive input data in a first clock cycle, wherein the each of the at least two computing units pre-stores at least two convolutional kernels, and wherein a duration of the first clock cycle is not shorter than a sum of durations of second clock cycles, each of the at least two convolutional kernels corresponding to one of the second clock cycles, and the each of the at least two computing units is configured to perform convolutional computation based on the input data and the at least two convolutional kernels during one of the second clock cycles;
   the controller being configured to control loading of the input data into the first cache, and to control the input data loaded into the first cache to be inputted into the at least two computing units, wherein the controller is configured to input the input data into a register of a first computing unit during the first clock cycle; and
   each of the at least two computing units being configured to perform, in the first clock cycle, the convolutional computation based on the input data and the pre-stored convolutional kernel, wherein the first computing unit is configured to input the input data into a register of a next computing unit in the at least one row of computing units during a next first clock cycle, the first computing unit being a computing unit that is not a last computing unit in the at least one row of computing units.

2. The convolutional computing accelerator according to claim 1, wherein
   the convolutional computing accelerator further comprises a second cache, and the computing matrix comprises at least two rows of computing units, the at least two rows of computing units forming at least two columns, and two adjacent computing units in each column being connected; and
   a second computing unit in the computing matrix is configured to store an accumulated convolutional computation result to the second cache.

3. The convolutional computing accelerator according to claim 2, wherein the second computing unit is further configured to add a convolutional computation result obtained by performing a convolutional computation in a previous first clock cycle and a convolutional computation result transmitted by a previous computing unit in the previous first clock cycle, to obtain the accumulated convolutional computation result.

4. The convolutional computing accelerator according to claim 3, wherein a third computing unit in the computing matrix is configured to:
   output the convolutional computation result obtained by performing the convolutional computation in the previous first clock cycle to a next computing unit.

5. The convolutional computing accelerator according to claim 4, wherein
   the third computing unit is further configured to add the convolutional computation result to initial accumulated data to acquire an addition computation result; and
   the third computing unit is further configured to output the addition computation result as an updated convolutional computation result.

6. The convolutional computing accelerator according to claim 3, wherein a fourth computing unit in the computing matrix is configured to:
   add the convolutional computation result, to obtain an addition computation result; and
   output the addition computation result, as an updated convolutional computation result.

7. A convolutional computing method performed by a convolutional computing accelerator, the convolutional computing accelerator comprising: a controller, a computing matrix, and a first cache,
   the computing matrix comprising at least one row of computing units, the at least one row of computing units comprising at least two computing units, wherein each of the at least two computing units is configured to receive input data in a first clock cycle, wherein the each of the at least two computing units pre-stores at least two convolutional kernels, and wherein a duration of the first clock cycle is not shorter than a sum of durations of second clock cycles, each of the at least two convolutional kernels corresponding to one of the second clock cycles, and the each of the at least two computing units is configured to perform convolutional computation based on the input data and the at least two convolutional kernels during one of the second clock cycles; the method comprising:
   controlling, by the controller, loading of the input data into the first cache;
   controlling, by the controller, the input data loaded into the first cache to be inputted into the at least two computing units, wherein the controller is configured to input the input data into a register of a first computing unit during the first clock cycle; and performing, in the first clock cycle, by each of the at least two computing units, the convolutional computation based on the input data and the pre-stored convolutional kernel, wherein the first computing unit is configured to input the input data into a register of a next computing unit in the at least one row of computing units during a next first clock cycle, the first computing unit being a computing unit that is not a last computing unit in the at least one row of computing units.

8. The method according to claim 7, wherein
the convolutional computing accelerator further comprises a second cache, the computing matrix comprising at least two rows of computing units, the at least two rows of computing units forming at least two columns, and two adjacent computing units in each column being connected; and
a second computing unit in the computing matrix is configured to add a convolutional computation result obtained by performing the convolutional computation in a previous first clock cycle and a convolutional computation result transmitted by a previous computing unit in a previous first clock cycle, to obtain an accumulated convolutional computation result, and to store the accumulated convolutional computation result to the second cache.

9. The method according to claim 8, wherein a third computing unit in the computing matrix is configured to
output the convolutional computation result obtained by performing the convolutional computation in the previous first clock cycle to a next computing unit.

10. The method according to claim 8, wherein a fourth computing unit in the computing matrix is configured to add the convolutional computation result, to obtain an addition computation result; and
output the addition computation result, as an updated convolutional computation result.

11. A non-transitory computer-readable storage medium, the storage medium storing one or computer executable instructions, when executed by one or more coprocessors, the computer executable instructions implement a method performed by a convolutional computing accelerator, the convolutional computing accelerator comprising: a controller, a computing matrix, and a first cache, the computing matrix comprising at least one row of computing units, the at least one row of computing units comprising at least two computing units, wherein each of the at least two computing units is configured to receive input data in a first clock cycle, wherein the each of the at least two computing units pre-stores at least two convolutional kernels, and wherein a duration of the first clock cycle is not shorter than a sum of durations of second clock cycles, each of the at least two convolutional kernels corresponding to one of the second clock cycles, and the each of the at least two computing units is configured to perform convolutional computation based on the input data and the at least two convolutional kernels during one of the second clock cycles; the method comprising:

controlling, by the controller, loading of the input data into the first cache;
controlling, by the controller, the input data loaded into the first cache to be inputted into the at least two connected computing units, wherein the controller is configured to input the input data into a register of a first computing unit during the first clock cycle; and
performing, in the first clock cycle, by each of the at least two computing units, the convolutional computation based on the input data and the pre-stored convolutional kernel, wherein the first computing unit is configured to input the input data into a register of a next computing unit in the at least one row of computing units during a next first clock cycle, the first computing unit being a computing unit that is not a last computing unit in the at least one row of computing units.

12. The non-transitory computer-readable storage medium according to claim 11, wherein
the convolutional computing accelerator further comprises a second cache, the computing matrix comprising at least two rows of computing units, the at least two rows of computing units forming at least two columns, and two adjacent computing units in each column being connected; and
a second computing unit in the computing matrix is configured to add a convolutional computation result obtained by performing the convolutional computation in a previous first clock cycle and a convolutional computation result transmitted by a previous computing unit in a previous first clock cycle, to obtain an accumulated convolutional computation result, and to store the accumulated convolutional computation result to the second cache.

13. The non-transitory computer-readable storage medium according to claim 12, wherein a third computing unit in the computing matrix is configured to output the convolutional computation result obtained by performing the convolutional computation in the previous first clock cycle to a next computing unit.

14. The non-transitory computer-readable storage medium according to claim 12, wherein a fourth computing unit in the computing matrix is configured to add the convolutional computation result, to obtain an addition computation result; and
output the addition computation result, as an updated convolutional computation result.

* * * * *